United States Patent [19]

Nordström

[11] 3,892,514
[45] July 1, 1975

[54] APPARATUS FOR PRODUCING CORRUGATED PLASTIC PIPE WITH HOLES IN THE PIPE WALL

[76] Inventor: Erik Gustav Wendel Nordström, Box 84, 840 20 Ange, Sweden

[22] Filed: June 12, 1973

[21] Appl. No.: 369,247

[30] Foreign Application Priority Data
June 13, 1972 Sweden............................ 7738/72

[52] U.S. Cl. .......... 425/308; 425/369; 425/DIG. 37
[51] Int. Cl. .......................................... B29d 23/18
[58] Field of Search .......... 425/308, 309, 296, 303, 425/396, 369, 467, DIG.37, 325, 326 R, 324 R

[56] References Cited
UNITED STATES PATENTS
2,491,589  12/1949  Slaughter ........................... 425/308
3,188,690  6/1965   Zieg .................................. 425/396 X
3,538,209  11/1970  Hegler ............................. 425/308 X FOREIGN PATENTS OR APPLICATIONS
334,227  7/1971  Sweden
317,926  3/1971  Sweden
118,338  7/1969  Norway Primary Examiner—Francis S. Husar
Assistant Examiner—Robert J. Charvat
Attorney, Agent, or Firm—Burns, Doane, Swecker & Mathis

[57] ABSTRACT

A method and apparatus is disclosed for producing longitudinally waved or corrugated plastic pipe with a plurality of holes in the pipe wall without significantly weakening the wall. Plastic is extruded into mould jaws having wave shaped or corrugated inner surfaces and containing a plurality of radial projections from the portions of the mould forming the inwardly projecting wave troughs. The plastic is forced against the mould and projections by compressed air leaving inwardly projecting hollow bosses or bubbles in the wave troughs. Upon drying of the plastic, the mould halves are drawn away and the bubbles are sheared off by a cylindrical cutting tool of substantially the same diameter as the inwardly projecting wave troughs and which is held stationary within the pipe as the pipe is forced over the tool by the extruding process.

6 Claims, 4 Drawing Figures

APPARATUS FOR PRODUCING CORRUGATED PLASTIC PIPE WITH HOLES IN THE PIPE WALL

This invention relates to an apparatus adapted to provide pipes of plastic, which are wave-shaped or corrugated in longitudinal direction, with a plurality of holes through the pipe wall as the manufacture of the pipe proceeds.

It is known to inject the plastic material, of which the pipe is to be formed, through an annular nozzle into mould jaws with wave-shaped inner surface, so that the resulting pipe wall is wave-shaped or corrugated, and at some distance from the nozzle in the interior of the pipe to attach a cutting tool with one or more cutting knives extending radially outwards into the area between the inner diameter and the outer diameter of the pipe, whereby one or more portions of the inwardly projecting wave troughs of the pipe wall are cut off and holes in the pipe wall are obtained. The radial indentations, however, thus effected in the wave troughs bring about an undesirable weakening of the pipe.

The present invention has as its object to provide an apparatus, which render it possible in a simple and easy manner to arrange a plurality of holes through the wall of pipes having a wave-shaped or corrugated wall, without weakening the pipe.

This object is achieved according to the invention by an apparatus, which is characterized in that relatively small bubbles are formed in the bottom material of the inwardly projecting wave troughs of the pipe wall by means of projections attached on the mould jaws, which bubbles project inwards to the interior of the pipe and after withdrawal of the projections out of the bubbles are cut off by a cutting tool mounted stationary in the movable plastic pipe, so that holes extending through the pipe wall are obtained.

An apparatus according to the invention is characterized in that the beads of the mould jaws are provided with relatively short inwardly directed projections, the side surfaces of which are in parallel with the direction of movement of the mould jaws toward and away from each other, so that upon movement of the mould jaw pairs away from each other the projections unobstructedly can be drawn out of the bubbles formed about them by the pipe wall material, and that in the position of commencing or entirely completed movement of the mould jaws away from each other a cutting tool is mounted stationary within the plastic pipe to cut off the bubbles so that holes through the pipe wall are obtained.

The according to the invention is explained in the following in conjunction with the description of an embodiment according to the invention shown by way of example in the accompanying drawing.

In the apparatus according to the invention, the pipe is manufactured by utilizing mould jaws 1 and 2 known in principle form, for example, the British patent specification 673,205, each mould jaw having the form of pipe halves and being provided on their inner surfaces with beads and grooves, said mould jaws 1, 2 running in endless guide tracks 20 and 21, which through a distance where the manufacture of the pipe is to take place run adjacent one another so as to form a closed hollow mould.

Figure 3:
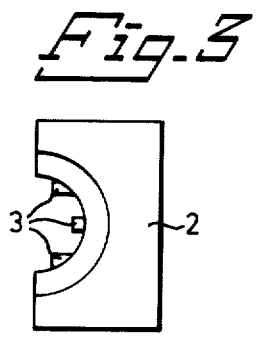
FIG. 3 shows a side view of a detail in the apparatus according to FIG. 1.
Figure 4:
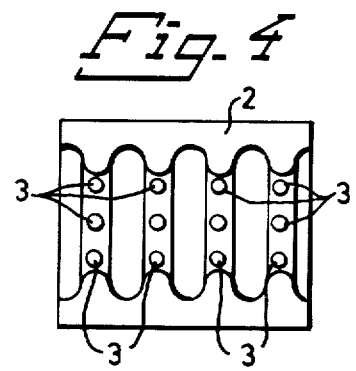
FIG. 4 shows the detail in FIG. 3 seen from the left in FIG. 3.

According to the invention, each of the mould jaws 1,2 is provided on the beads of its inner surface with radial projections 3, FIGS. 2,3 and 4, the side surfaces of which, for a purpose explained below, extend in parallel with the direction of movement of the mould jaws toward and away from each other.

A stationary annular extrusion nozzle 4 for extruding plastic, preferably polythene, extends in-between mould jaw pairs 1, 2 where they meet and form a closed hollow mould. A passageway 5 extending through said nozzle 5 has several outlets whereof one is visible in FIG. 1. From the nozzle 4 extends an extended portion 7, which at a suitable distance from the nozzle 4 includes a filler body 8 adapted to fill out the hollow cross-section of the plastic pipe 14 and provided on its cylindric outer surface with axial grooves 9, along which the projections 3 of the mould jaws run free. The axial length of the grooved portion of said body 8 exceeds slightly the division distance of the beads of the mould jaws.

A cylindric cutting tool 10 with a circular cutting edge 11 is connected to the body 8 by means of a connecting member 12, such as a chain, strip, rod or the like, and preferably adapted to be controlled by the inside of the wave troughs of the pipe 14.

Figure 1:
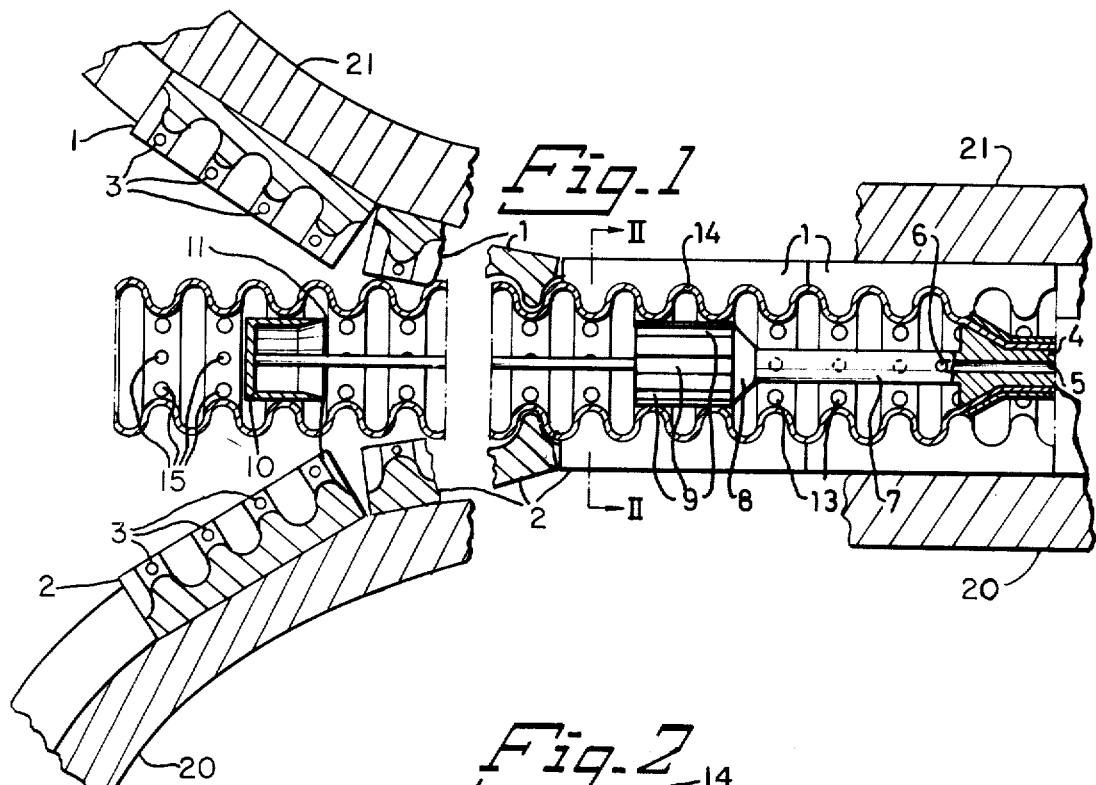
FIG. 1 shows a horizontal central section taken on line I—I of FIG. 2 through two parts of the apparatus during the manufacture of a plastic pipe with holes.
Figure 2:
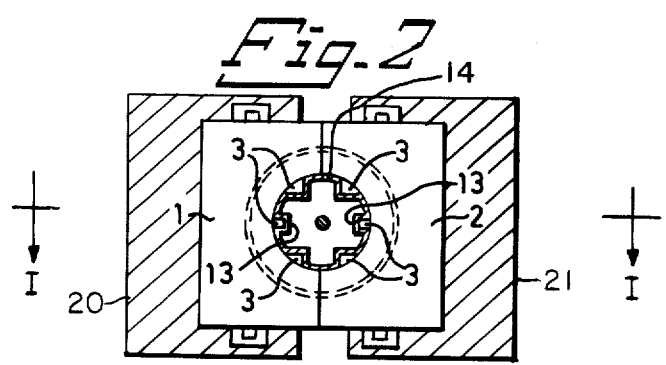
FIG. 2 shows a cross-section after the line II—II in FIG. 1.

At the same time as plastic is being extruded through the nozzle 4, compressed air is injected from the passageway 5 and outlets 6, so that the extruded plastic through the distance all the way to the filler body 8 is urged against the grooves and beads of the mould jaws and the projections 3 on the beads, whereby inwardly projecting hollow bosses or bubbles 13, FIGS. 1 and 2, are obtained which during the movement of the mould jaws, the thereby of the plastic pipe, to the left in FIG. 1 pass through the grooves 9 of the filler body 8 and fill out the grooves. Owing to the axial length of the body 8, each groove is constantly clogged by at least one bubble 13 to prevent air leakage through the grooves.

After the mould jaws 1,2 in pairs adjacent each other, together with the pipe 14 have continued whilst cooling to run through a distance away from the filler body 8, the mould jaws begin to run diametrically away from each other. Thereby the projections 3 unobstructedly slide out of the bubbles 13, and preferably immediately thereafter the bubbles 13 run against the edge 11 of the cutting tool 10 and are cut off, so that open holes 15 are obtained through the bottom portion of the inwardly projecting wave trough, and not through the side surfaces of said wave trough, which would have a weakening effect on the pipe. The cutting-off operation of the bubbles may take place so that an annular collar is obtained about the holes and acts as a reinforcement.

The apparatus according to the invention is not to be regarded restricted only to the apparatus described, as variations thereof are imaginable within the scope of the invention. The number and location of projections and of bubbles obtained thereof for effecting holes in the pipe wall can be varied, depending for example on the pipe dimension, and the bubbles may be arranged irrespectively of whether the beads of the mould jaws extend annularly or helically. The holes may be given any section. It is possible to design the apparatus in question so that some of the inwardly projecting wave troughs do not show holes, and it is, consequently, possible to provide the pipe with an optional number of holes per length unit of pipe, according to demand. The cutting tool may have planing tool teeth, which may be radially adjustable so that they plane off the bubbles at a desired distance from the adjacent pipe wall surface.

I claim:

1. Apparatus for producing corrugated plastic pipe having a plurality of holes through the pipe wall spaced along the length of the pipe comprising:
   an extrusion nozzle;
   a pair of complementary mold jaws mounted in guide tracks for movement together at the nozzle and for separation at a downstream station with each mold jaw having aligned ridges separated by grooves to form corrugated pipe walls;
   a plurality of radially inwardly directed projections on the inside surfaces of the mold ridges, the radial length of the projections being relatively short and the shape of the sidewalls of the projections being such that by separation of the mold jaws the projections are withdrawn from inwardly directed bubbles formed on the interior pipe walls; and
   cutting means located inside the formed pipe and downstream of said nozzle and beyond where the projections are withdrawn from the formed bubbles for cutting off the bubbles so that holes through the pipe walls are obtained.

2. Apparatus for producing corrugated plastic pipe having a plurality of holes through the pipe wall spaced longitudinally along the length of the pipe comprising:
   an extrusion nozzle including an annular peripheral opening for extruding molten plastic and a central portion having a passageway for supplying a gas under pressure to the interior of said pipe;
   a filler body extending from the extrusion nozzle and substantially filling the cross section of the formed pipe;
   a pair of complementary mold jaws mounted in guide tracks for movement together at the nozzle and for separation downstream beyond said filler body, with each mold jaw having aligned ridges separated by grooves to form corrugated pipe walls;
   a plurality of longitudinally aligned, radially inwardly directed projections on the inside surfaces of the mold ridges, the radial length and the shape of the sidewalls of the projections being such that by separation of the mold jaws at a position downstream of said filler body, the projections are withdrawn from bubbles formed on the interior surface of the pipe walls; and
   cutting means located inside the formed pipe downstream of the location where the projections are withdrawn from the bubbles for cutting off the bubbles so that holes through the pipe walls are obtained.

3. Apparatus as defined in claim 2 wherein the filler body has on its outer surface axial grooves aligned with the projections on the mold jaws so that the bubbles formed over the projections pass through said grooves, and the axial length of the grooves on the filler body is at least as great as the distance between adjacent projections on said mold jaws.

4. Apparatus as defined in claim 3 wherein the projections on each ridge of the mold jaw and the length of the grooves on the filler body slightly exceed the distance between adjacent beads on the mold jaws.

5. Apparatus as defined in claim 4 wherein the cutting means is mounted to the filler body by a connecting member to be held in position inside the formed pipe.

6. Apparatus of defined in claim 3 wherein the cutting means is mounted to the filler body by a connecting member to be held in position inside the formed pipe.

* * * * *